United States Patent [19]
Wood et al.

[11] Patent Number: 5,711,208
[45] Date of Patent: Jan. 27, 1998

[54] POPCORN CABINET

[75] Inventors: Gary Wood, Fort Mitchell; Leroy Hubbard, Independence, both of Ky.

[73] Assignee: Gold Medal Products Company, Cincinnati, Ohio

[21] Appl. No.: 778,378

[22] Filed: Dec. 31, 1996

[51] Int. Cl.[6] .............................. A23L 1/18; A47F 3/00
[52] U.S. Cl. ............................... 99/323.5; 312/138.1
[58] Field of Search ........................... 99/323.5, 323.6, 99/323.7, 323.8, 323.9, 323.11; 312/236, 114, 117, 122, 126, 128, 138.1, 287; 219/214

[56] References Cited

U.S. PATENT DOCUMENTS

| | | | |
|---|---|---|---|
| 495,886 | 4/1893 | Hacker | 99/323.11 |
| 2,875,013 | 2/1959 | Fitzgerald | 312/236 |
| 3,812,774 | 5/1974 | Day et al. | 99/323.8 |
| 4,850,120 | 7/1989 | Stein | 312/236 X |

*Primary Examiner*—Reginald L. Alexander
*Attorney, Agent, or Firm*—Wood, Herron & Evans, L.L.P.

[57] ABSTRACT

Apparatus for popping and warmly storing popped corn includes a cabinet with side-by-side popping and serving chambers preferably, but not necessarily, separated by a partition. A rear side of the cabinet provides access to both chambers through a common or two separate rear openings or doors while a front side of the cabinet provides access only into the storage chamber through a front opening or door. Any front door is preferably self-closing.

13 Claims, 2 Drawing Sheets

POPCORN CABINET

This invention relates to popcorn popping and service and more particularly to cabinets for popping and holding popped corn for consumption.

In the past, it has been known to provide cabinets in which popcorn is popped and dropped into the cabinet in a pile for filling in a box or bag by an operator for delivery to a consumer. It is preferred not to have consumers reaching into the cabinet in order to eliminate the possibility they may be burned by kettle contact, popping corn, hot oil, or the like. It is, nevertheless, desirable to store popped corn in a warm environment for sale to consumers. It is also desirable to present popped corn to consumers in an attractive, sales increasing manner wherein consumers can reach into the storage area to obtain popped corn without fear of being burned.

Accordingly, it has been one objective of the invention to provide an improved popping and serving apparatus for popping corn and for storing popped corn.

A further objective of the invention has been to provide improved apparatus for popping and serving popcorn by direct consumer access without exposure to the popping kettle.

To these ends, a preferred embodiment of the invention contemplates an improved housing or cabinet for enclosing both the popping process on one hand and the storage process on the other hand, while at the same time more readily and safely presenting popped corn to a consumer. More particularly, a popcorn popping and serving cabinet according to the invention includes a partitioned cabinet having a corn popping area or chamber and an independent or separate storage area or chamber for popped corn. Both chambers are accessible to an operator but only the serve chamber is accessible to a consumer. The corn popping area includes a typical popping kettle where popcorn can be popped with heated popping oil and then dumped. An operator scoops warm popped corn in the popping chamber into containers such as single service bags or boxes, and place these containers in the other separate or independent storage chamber of the cabinet to keep warm until directly moved by a consumer.

The cabinet has a front and rear side. A first door on the rear side opens the popping chamber for access by the operator to service the corn popping operation and the bag or box loading. A second door on the rear side opens the storage chamber so the operator can place the filled bags and boxes onto shelves for warm storage. Preferably lights or heaters are used to keep the storage area warm. Heat from the popping area also tends to warm the storage chamber.

The front side of the cabinet is provided with a third door opening only into the storage or serving chamber of the cabinet. Opening this door provides access to the warm loaded bags or boxes but not to the separate popping chamber and kettle therein. Preferably, a self-closing roller-supported door is used so it shuts properly after use by a consumer.

Accordingly, an operator can access both chambers from the rear of the apparatus, but only the storage chamber is accessible by a consumer at the front of the apparatus. Corn is popped, loaded in containers and placed in the service side of the cabinet by an operator at the rear end of the apparatus. This may be, for example, the service or back side of a retail counter. The machine is located such that its front side is oriented outwardly, such as adjacent or near a consumer's position at a counter. The consumer can merely open the door, obtain a container, and allow the door to close, thus serving himself with a warm container of hot popcorn without entrance to the area of the hot kettle or the hot corn or oil it may produce or drop. Once the storage or service side is low, the operator can pop more corn and load more filled containers into the service side for easy direct access by the consumer.

One advantage of the invention is that it limits untrained customer access to the hotter popping chamber area, yet displays freshly popped, warm corn to the consumer and allows the consumer direct access to still warm freshly popped corn.

Another advantage of the invention is that it does not require individual operator attention for each consumer purchase. In other words, the apparatus can be placed at a convenient place or point of sale for consumer access near a check out or pay station where the consumer retrieves his own popcorn and then pays for it either alone or together with other items of merchandise, food or drink purchased in the same facility. An operator's attention is required only to pop new corn, or to load popped corn into containers and place it in the serve side when it is empty. This can be done at times when the operator is free of other chores and thus makes him more efficient while presenting freshly popped and warmly stored popcorn in a very easily accessed cabinet for easy or impulse retrieval by a consumer.

The presentation of readily accessible warmed stored popcorn for the consumer just next to the non-accessible popping chamber increases the attractiveness of the product for sale, yet overcomes the noted safety concerns and increases the operator's efficiency.

These and other objectives and advantages of the invention will be readily understood from the following detailed description of a preferred embodiment of the invention and from the drawings in which.

Figure 1:
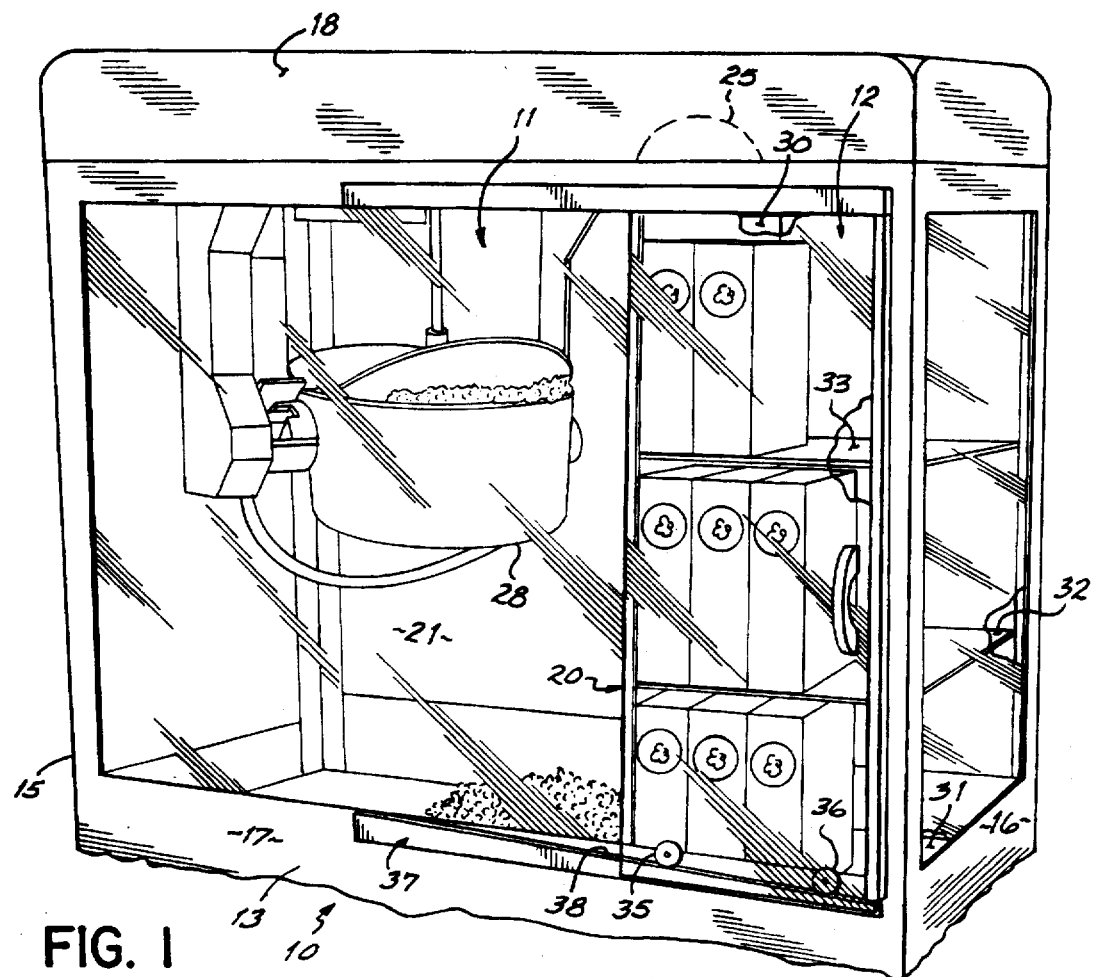
FIG. 1 is a perspective showing a front side and one end of one embodiment of the invention.

Turning now to the drawings, there is shown in FIG. 1 a perspective view of an apparatus 10 for popping and storing popcorn. Apparatus 10 comprises a cabinet having a popping chamber or area 11 and a storing chamber or area 12. The cabinet has a front side 13, a rear side 14 and two ends 15 and 16.

The bottom of the cabinet 10 may have a peripheral enclosure 17 and the top a peripheral enclosure 18.

A self closing door 20 is disposed on the front side 13 of the cabinet and provides access directly into the storing chamber 12.

The front of the popping chamber 11 is comprised of, for example, a clear glass or plastic panel 21. On the rear side 14 of the cabinet, a separate door 22 is provided for access into the rear side of the storing chamber 12, while a rear door 23 is provided for access to the popping chamber 11. Each end 15 and 16 of the cabinet may comprise transparent or translucent panels, such as glass, plastic or some other material.

At the upper end of the cabinet within enclosure 18, is preferably located a warming lamp 25 situated above the storing chamber 12. In a preferred embodiment, electric strip heaters 26 or some other form of heaters may be provided at the bottom portion of the storing chamber 12, and these may be used in addition to, or alternatively to, a warming lamp 25.

In another alternative form of the invention, the warming lamp and heaters might be omitted with the storing chamber 12 simply heated by heat given off by the popping kettle 28 located in the popping chamber 11. Popping kettle 28 may be any suitable form of corn popping kettles, as is well known in the art. The kettle is heated so as to heat oil and popcorn kernels within the kettle and pop the kernels. The kettle is mounted for rotation on brackets so that popcorn may be dumped from the kettle into the bottom of the popping chamber 11.

Preferably, the popping chamber 11 and storing chamber 12 are separated by a partition 30 which prevents manual access from one chamber to the other. The partition 30 may comprise a panel of glass or plastic, preferably transparent, a wire grid or other grid of any suitable material, a vented panel or any other suitable partition. Any suitable form of partition or material could be utilized. Alternatively, it should be appreciated that only partial partitioning may be used, sufficient to prevent access to the popping chamber from through the front door to the storage chamber. Also, it may not be necessary to provide any partition 30 between the popping and storing chambers 11 and 12 at all where the configuration of cabinet and doors refrain consumer access to the popping chamber from the front of the apparatus.

In the event that a solid or plate-like partition is utilized, it is preferable to use a vented or pierced partition or a grid-like partition, or a partition slightly spaced at its edges from front and back walls of the cabinet so that heat from the popping kettle 28 can be transmitted or convected to the storing chamber 12 so as to maintain popcorn stored therein at a warm serving temperature.

It will be appreciated that the storing chamber 12 is provided with one or more shelves, such as shelves 31, 32 and 33, as shown in the drawing. These shelves are spaced to support preferably single service containers of popped corn, such as popcorn bags or popcorn boxes.

Figure 2:
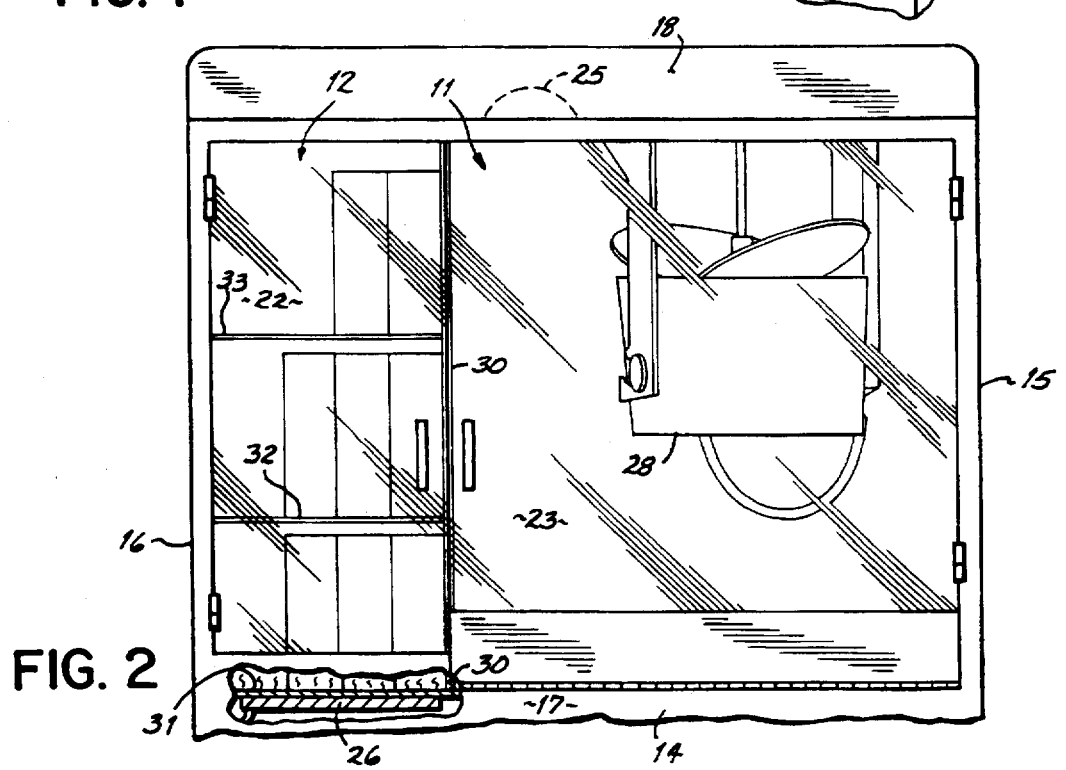
FIG. 2 is an elevational view of a rear side of the invention of FIG. 1 showing the operator doors to both popping and serving chambers.
Figure 3:
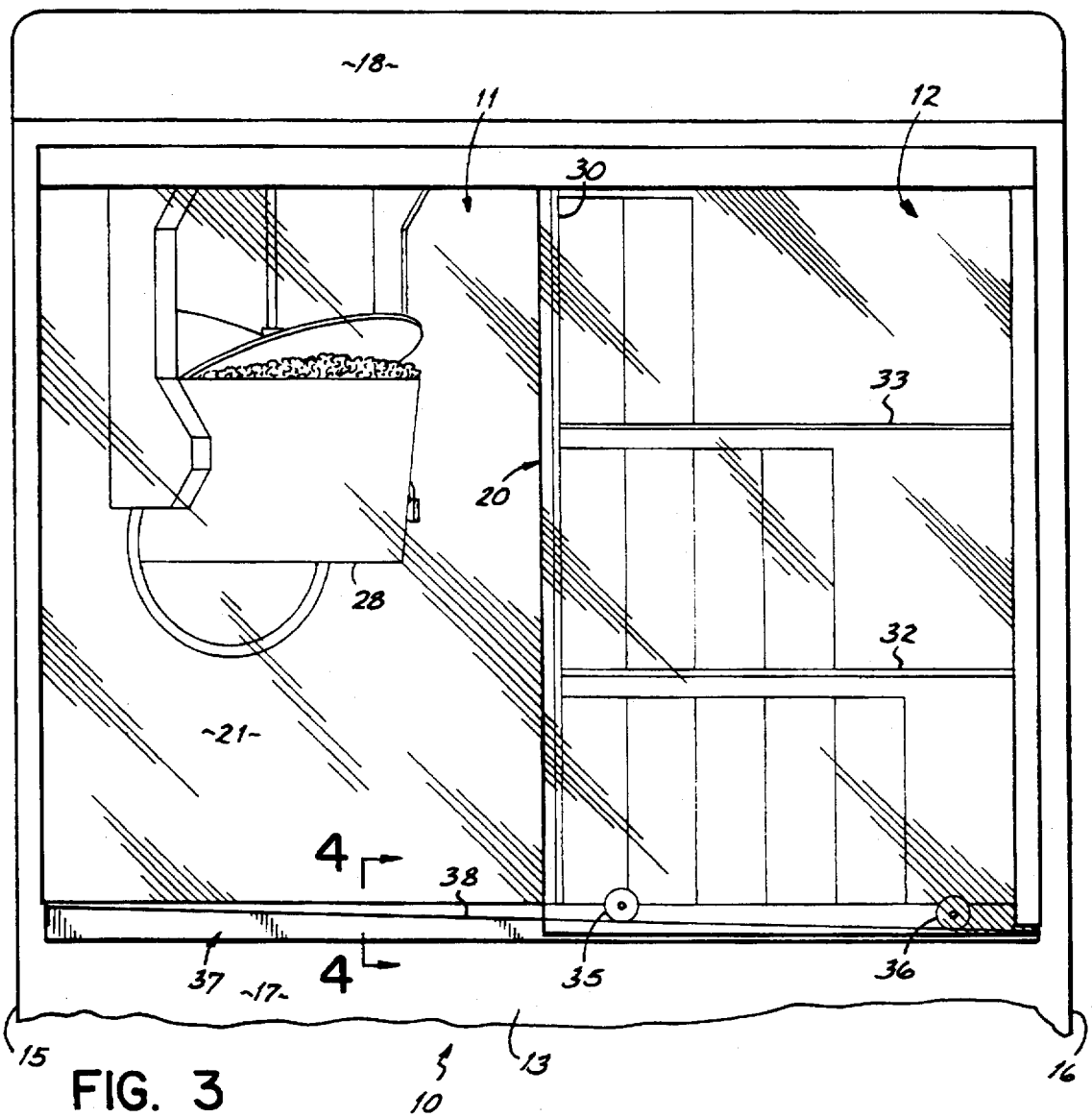
FIG. 3 is a front elevational view showing details of a self-closing front door to the serving chamber of another embodiment of the invention.
Figure 4:
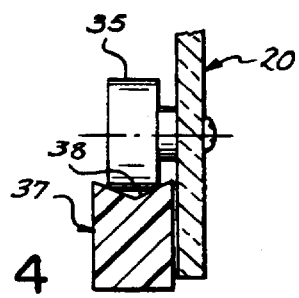
FIG. 4 a cross-sectional view taken along lines 4—4 of FIG. 3.

Turning now to a further description of the self-closing door 20, attention is drawn to FIG. 3, showing a modified cabinet from that of FIGS. 1 and 2. Generally, the structure is the same except for the overall proportions of the cabinets. In FIGS. 1 and 2, the popping chamber takes up about two-thirds of the cabinet and the storage chamber about one third. In FIGS. 3 and 4, the chambers are approximately equal in volume. The same numbers in each figure are used to denote similar or identical parts. It will be appreciated that the self-closing door is mounted on rollers which, themselves, are disposed on an ascending ramp or incline, such that when the door is opened, the door is raised or lifted and kinetic energy is stored in the door. When the door is thereafter released, the kinetic energy stored in the door causes the door to simply roll down the ramp to a closed position, as shown in FIG. 1.

In more detail, a front elevational view of the cabinet 10 of both FIGS. 1 and 3 illustrates the mounting apparatus for self-closing door 20 (FIG. 3). Two rollers 35, 36 are mounted, preferably, on the rear side of the door, roller 35 disposed on the door in a position above roller 36. A ramp 37, including inclined surface 38, extends across the front of cabinet 10. The ramp may extend all the way across the front of the cabinet 10 (FIG. 3) or only partially across the cabinet 10 (FIG. 1), but in an event a sufficient distance to accommodate full door opening. Rollers 35, 36 rest on inclined surface 38 of ramp 37. Surface 38 in cross-section can be of any suitable shape. One such shape is as shown in FIG. 4 wherein surface 38 constitutes a V-shaped trough in which rollers 35, 36 reside and roll.

Alternatively, rollers could be mounted in the cabinet and an inclined ramp on the door to the same end. Other forms of self-closing doors can be used, as well as other ramp cross-sections and roller profiles.

When door 20 is pushed to the left toward the popping chamber, it rides up ramp 37. The door 20 constantly tends to ride down the ramp to the right to its fully closed position in front of the storage cabinet. When released, the door thus moves to a closed position, closing the front access to the storage cabinet of its own accord. The ramp incline angle is selected so that even if the door is moved fully left and suddenly released, it will not slam into the cabinet 10 or onto any stop any more forcefully than is desired.

In use, it will be appreciated that only the serving or storing chamber 12 is accessible from the front side 13 of the cabinet 10 through door 20. On the other hand, both the popping chamber 11 and the storing chamber 12 is accessible from the rear side 14 of the cabinet 10. While the cabinet has been described as having a front door to the storing chamber, and two rear doors, one to the popping chamber and one to the serving chamber, it will be appreciated that the popping chamber and serving chamber can be accessed through the rear of the cabinet in several different suitable and alternative ways. It may be only necessary to have a single rear side opening through which both chambers can be accessed from the rear of the cabinet, or two separate openings might be provided and thus a single or two doors may be provided at the rear of the cabinet. Also, a partial tilt-Out rear side panel is hinged beneath the door 23 is used to open the popping chamber but to hold popped corn therein. A bracket or stop (not shown) limits the tilt-out angle in a well known manner.

At the front of the cabinet, however, the popping chamber is covered by the panel 21 and the end panel at end 15, so that the popping chamber to the front and the side is protected by these panels. While the popping chamber can be reviewed and seen through these sides, it is not possible for a consumer or observer to reach his hand into the popping chamber, into the vicinity of the hot kettle or beneath the hot kettle where hot popped corn or oil might be poured. At the same time, the serving or storage chamber 12 is accessible from the front side 13 of the cabinet so that a consumer may reach in and remove a bag or box of popcorn from one of the shelves.

In this regard, it will be appreciated that the operation of the apparatus is as follows. An operator fills and operates the kettle, so as to produce popped popcorn. The kettle can be dumped, for example, to dump the popped popcorn into the bottom of the popping chamber 11. Preferably there is at least a partition oriented from the bottom of the popping chamber to some direction upwardly to separate the popping and serving chambers so that popped corn loosely is confined within the popping chamber.

An operator thereafter scoops the popped corn into bags or boxes, preferably single service bags or boxes, the access to which corn he has gained through the rear door 23. He then places the boxes or bags on the shelves in the storage chamber through the rear door 22. Thus, he does not have to move around to the front of the cabinet, either to operate the popping of the popcorn or to fill the storage chamber 12 with popped corn.

Thereafter, a consumer passing by the apparatus is able to access the storage chamber 12 through the front door 20, which he can open and reach through to retrieve one or more containers of popped corn. In a commercial setting, he would then transport the product to a pay station, for example, where he would pay for the product.

It is thus unnecessary that the operator be present to dispense to the consumer one or more containers of popcorn. At the same time, given the transparent panels and doors of the apparatus, it is clear that a consumer can see popcorn being popped and/or stored in the popping chamber 11 and, as well, can see the loaded popped corn in the service containers in the storing chamber 12, warmly stored and freshly popped.

The consumer is thus enticed to purchase the popcorn while, at the same time, it is not necessary to call an operator over for each single retrieval or service to a customer.

Moreover, it is not possible for the customer to reach into the popping chamber from the front of the apparatus and place himself in danger of a burn, for example. Even where there is no partition between the two chambers, or only, for example, a partial partition rising up from the bottom or handing down from the top of the cabinet, the machine is of such a size that the kettle would not generally be easily accessible from the front of the apparatus through the self-closing front door 20.

Thus, an operator need only attend the apparatus when it is necessary to pop more corn and/or to dump popped corn and fill more containers for loading the storage chamber 12.

Alternatively, any automatic popping apparatus may be used in the popping chamber to render the unit even more efficient. Such would require even less operator attention.

Accordingly, it will be appreciated that the invention contemplates side-by-side popping and storage chambers with access to both chambers through a rear of the machine and access to the serving chamber only from the front of the machine. Separate doors may be provided at the rear for access to the respective serving and popping chambers and a single door to the front, for access to the serving or storage chamber.

The advantages of the display of freshly-popped and warmly-stored popcorn to the consumer are maintained while, at the same time, access of the consumer to the popping chamber is limited. Moreover, the apparatus is such that it does not necessarily require constant attention by the operator. Many individual servings can be dispensed without any operator attention.

These and other advantages and modifications will become readily apparent to those of ordinary skill in the art without departing from the scope of the invention, and applicant intends to be bound only by the claims appended hereto.

What is claimed is:

1. A cabinet for housing a corn popper and for storing popped corn comprising the combination of:

said cabinet having front and rear sides;

a corn popping chamber in said cabinet between said sides;

a popped corn storage chamber in said cabinet between said sides;

a first door in said rear side opening to said popping chamber;

a second door in said rear side opening to said storage chamber;

a third door in said front side opening into said storage chamber; and a partition separating said two chambers.

2. Apparatus as in claim 1 including a corn popping kettle in said popping chamber.

3. Apparatus as in claim 1 further including a warming apparatus in said storage chamber.

4. Apparatus as in claim 1 further including popcorn container supporting shelves in said storage chamber.

5. Apparatus as in claim 1 wherein said third door is self-closing.

6. Apparatus as in claim 5 wherein said third door is mounted to rise when opened and stores in its open condition kinetic energy to close said door when said door is released to close.

7. Apparatus as in claim 5 further including rollers mounted on said third door and a ramp extending in a direction across the cabinet with a higher section in front of the popping chamber and a lower section in front of the storage chamber, said rollers disposed on said ramp such that said door, when moved toward said popping chamber, tends to move back to a closed position in front of the storage system of its own accord.

8. Apparatus as in claim 5 including one of said rollers and said ramp mounted on one of said cabinet and said third door, and the other of said rollers and said ramp mounted on the other of said cabinet and said third door for self-closing of said door.

9. Cabinet apparatus for housing a corn popper and for storing popcorn, and including:

a corn popping chamber;

a popped corn storage chamber;

a front door and a rear door opening to said storage chamber; and a rear door opening to said popping chamber;

said chambers disposed side by side and separated from each other by a partition.

10. Cabinet apparatus for ousing a corn popper and for storing popcorn and comprising:

said cabinet having a popping chamber and a storage chamber;

said cabinet having a front side and a rearward side;

an access opening to each chamber from said rear side of said cabinet;

an access opening only to said storage chamber from said front side of said apparatus.

11. A cabinet for housing a corn popper and for storing popped corn and comprising:

said cabinet having side-by-side popping and storage chambers disposed between front and rear sides of said cabinet;

at least one access opening to both chambers from a rear side of said cabinet; and at least one access opening to said storage chamber from a front side of said cabinet.

12. Apparatus as in claim 11 further including a partition separating said chambers.

13. Apparatus as in claim 11 further including a self-closing door in front of said storage chamber.

* * * * *